(12) United States Patent
Hodge

(10) Patent No.: US 9,674,198 B1
(45) Date of Patent: Jun. 6, 2017

(54) CONTROLLED ENVIRONMENT SECURE MEDIA STREAMING SYSTEM

(71) Applicant: **Global Tel*Link Corporation**, Reston, VA (US)

(72) Inventor: Stephen Hodge, Aubry, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 15/342,280

(22) Filed: Nov. 3, 2016

Related U.S. Application Data

(63) Continuation of application No. 15/070,836, filed on Mar. 15, 2016.

(51) Int. Cl.
*H04L 29/06* (2006.01)
*G06F 21/10* (2013.01)
*G06Q 20/10* (2012.01)

(52) U.S. Cl.
CPC .......... *H04L 63/101* (2013.01); *G06F 21/105* (2013.01); *G06Q 20/10* (2013.01); *H04L 63/083* (2013.01); *G06F 2221/0735* (2013.01); *G06F 2221/2141* (2013.01)

(58) Field of Classification Search
None
See application file for complete search history.

(56) References Cited

U.S. PATENT DOCUMENTS

| 6,810,527 B1 | 10/2004 | Conrad et al. |
| 8,832,374 B1 | 9/2014 | Schaefers |
| 8,917,848 B2 | 12/2014 | Torgersrud et al. |
| 8,929,525 B1 | 1/2015 | Edwards |
| 9,332,014 B2 | 5/2016 | Keiser et al. |
| 2004/0172652 A1 | 9/2004 | Fisk et al. |
| 2011/0249073 A1 | 10/2011 | Cranfill et al. |
| 2011/0307548 A1 | 12/2011 | Fisk et al. |
| 2012/0257583 A1* | 10/2012 | Keiser ................. H04L 65/4076 370/329 |

(Continued)

OTHER PUBLICATIONS

Copyright Registration Record for "iPhone: The Missing Manual," 6th ed., 2012; 1 page.

(Continued)

*Primary Examiner* — Amir Mehrmanesh
(74) *Attorney, Agent, or Firm* — Sterne, Kessler, Goldstein & Fox P.L.L.C.

(57) ABSTRACT

A Controlled Environment Secure Media Streaming System manages the delivery of content to Secured Devices. Cloud Services provide content to Integration Hub. The Integration Hub interfaces with various cloud services providers and prepares content for consumption by a resident of a secured facility. Integration Hub utilizes Content Filter to inspect content received from cloud service providers for suitability for use in a secured environment. Once content is retrieved, filtered, formatted, and packaged by Integration Hub, the content is stored in Data Warehouse. Secured Devices request content from the Distribution Hub, the Distribution Hub retrieves the content from the Data Warehouse, and then Distribution Hub manages the transfer of content to the Secured Devices. In some embodiments, Distribution Hub utilizes Content Filter to determine whether or not a particular Secured Device can access particular content.

26 Claims, 7 Drawing Sheets

(56) References Cited

U.S. PATENT DOCUMENTS

| | | |
|---|---|---|
| 2012/0262271 A1 | 10/2012 | Torgersrud et al. |
| 2014/0267547 A1 | 9/2014 | Torgersrud et al. |
| 2014/0270126 A1* | 9/2014 | Torgersrud .............. H04M 3/38 379/189 |
| 2014/0273929 A1 | 9/2014 | Torgersrud |
| 2015/0188925 A1 | 7/2015 | Gupta |

OTHER PUBLICATIONS

Excerpts from "iPhone: The Missing Manual," 6th ed., Sebastopol, CA: O'Reilly Media, 2012; 556 pages (submitted in 10 parts).
Prosecution History of U.S. Pat. No. 8,929,525, U.S. Appl. No. 14/323,582, filed Jul. 3, 2014.
U.S. Appl. No. 61/801,861, filed Mar. 15, 2013; 77 pages.

* cited by examiner

US 9,674,198 B1

CONTROLLED ENVIRONMENT SECURE MEDIA STREAMING SYSTEM

CROSS-REFERENCE TO RELATED APPLICATIONS

This application is a continuation of U.S. application Ser. No. 15/070,836, filed Mar. 15, 2016, which is incorporated by reference herein in its entirety.

BACKGROUND

Field

The disclosure relates to methods and systems for delivery of content from cloud service providers in secured facilities.

Background

Cloud computing is a model for enabling ubiquitous, convenient, on-demand network access to a shared pool of configurable computing resources (e.g., networks, servers, storage, applications, and services) that can be rapidly provisioned and released with minimal management effort. One subset of cloud computing includes the delivery of services such as multimedia and other content. Cloud services are now ubiquitous parts of the modern mobile computing environment. Examples of cloud services are music delivery, video delivery, streaming music, streaming video, digital books, digital magazines, games, or other software applications. Some examples of well-known cloud services are Spotify™ and Pandora™ for music, Netflix™ and Hulu™ for video and movies, and the App Store™ or Google Play™ for applications ("apps") and games for mobile devices.

BRIEF SUMMARY

In an embodiment, a Controlled Environment Secure Media Streaming System manages the delivery of content to a number of Secured Devices. Cloud Services are any type of centrally-distributed service that are delivered to a computing device. For example, Cloud Services 102 can be music delivery, video delivery, streaming radio, streaming video, digital books, digital magazines, games, or other software applications ("apps"). Some cloud services are third party products or services. Each Cloud Service delivers or makes available some kind of content. Examples of the content delivered by Cloud Services are music, video, radio, movies, television shows, digital books, digital magazines, games, or applications ("apps").

Numerous third party cloud services exist and the cloud services delivery system is adaptable to be compatible with any third cloud services provider. Some cloud services deliver data one time, for example an application need only be downloaded one time and may be used locally many times. Some cloud services make available vast libraries of content that are streamed on demand by the end user. The Controlled Environment Secure Media Streaming System is compatible with one-time delivery of content, on-demand streaming of content, and access to libraries of content.

A unit of content is whatever is the appropriate measure of content for each cloud service. For example, a unit of content for a music provider is either a song or an album. The unit of content for a video provider is one film or video clip. In some embodiments, the unit of content may be a single viewing or accessing of a film, video, song, or album. In these embodiments, viewing or accessing the content a second time would be counted as a second unit of content. In some embodiments, the unit of content is time limited access to a library of content. For example, a music provider may sell a month of access to a library of music for a flat fee. During this period of time the end user has unlimited access to the entire library of content. Other timeframes may be available as well, such as daily or weekly access to libraries of content. Other units of content are within the scope of the Controlled Environment Secure Media Streaming System as well, as determined by the requirements and availability set by Cloud Service Providers.

Cloud Services provide or make available content to an Integration Hub. The Integration Hub interfaces with various cloud services providers and prepares content for consumption by a resident of a secured facility. Integration Hub utilizes a Content Filter to inspect content received from cloud service providers for suitability for use in a secured environment. Only permitted content is allowed to enter the Controlled Environment Secure Media Streaming System. Once content is retrieved, filtered, formatted, and packaged by Integration Hub, the content is stored in Data Warehouse. Data Warehouse may be any type of data storage and retrieval system suitable to store and retrieve disparate types of data and content.

The Distribution Hub manages connections to a plurality of Secured Devices. Secured Devices request content from the Distribution Hub, the Distribution Hub retrieves the content from the Data Warehouse, and then Distribution Hub manages the transfer of content to the Secured Devices. In some embodiments, Distribution Hub utilizes the Content Filter to determine whether or not a particular Secured Device can access particular content.

The Distribution Hub records content distribution and access by Secured Devices and reports usage to the Reporting Services Module. Reporting Services Module, in turn, aggregates usage information and reports back to the respective Cloud Services.

The foregoing and other aspects, features, details, utilities, and advantages will be apparent from reading the following description and claims, and from reviewing the accompanying drawings.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

FIGS. 1A-C illustrate three embodiments of an exemplary Controlled Environment Secure Media Streaming System.

DETAILED DESCRIPTION

Figure 1A:
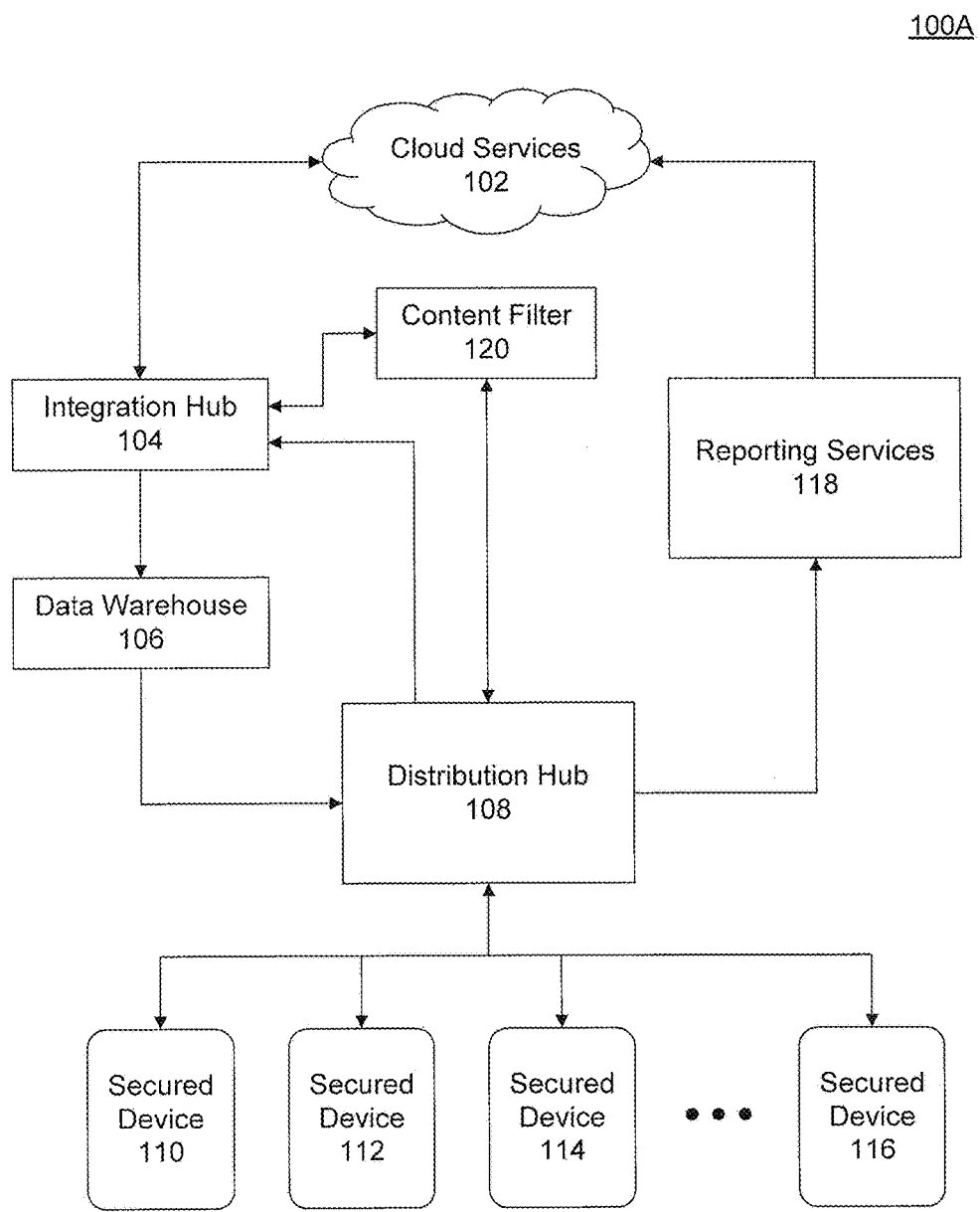

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Environment Overview

The Controlled Environment Secure Media Streaming System is designed to operate within a controlled environment. In an embodiment, the controlled environment is a correctional institution such as a prison facility and the residents are inmates or otherwise incarcerated in the correctional institution. In other embodiments, the controlled environment may be any type of facility with a need to control and monitor content consumption such as a hospital, a dormitory, a mental health institution, a hotel, or other such facilities. These types of controlled environments have unique requirements on the distribution and consumption of content and media that are not present in other, non-controlled environments. For example, in a prison, the authority operating the prison has a strong interest in controlling the consumption and exposure to media and other content. For example, extremely violent media and content is not appropriate for a violent offender. In another example, some media content is associated with particular social movements or gang activity and may be deemed not appropriate for prisoner consumption. Even in the case of appropriate content, prison authorities may control access to media and content, for example as a reward for good behavior. In these ways, conventional media and content distribution systems do not address the unique needs and requirements of a system designed for controlled environments.

FIG. 1A illustrates an embodiment of a Controlled Environment Secure Media Streaming System 100A. Cloud Services 102 are any type of centrally-located and/or internet distributed service that may be delivered to a personal computing device. For example, Cloud Services 102 can be music delivery, video delivery, streaming radio, streaming video, digital books, digital magazines, games, or other software applications ("apps"). Some cloud services are third party products or services. Each Cloud Service delivers some kind of content. Examples of the content delivered by Cloud Services 102 are music, video, radio, movies, television shows, digital books, digital magazines, games, or apps.

Numerous third party cloud services exist and the cloud services delivery system is adaptable to be compatible with any third cloud services provider. Some cloud services deliver data one time, for example an application need only be downloaded one time and may be used many times. Some cloud services make available vast libraries of content that are streamed on demand by the end user. The cloud services delivery system is compatible with one-time delivery of content, on-demand streaming of content, and access to libraries of content.

A unit of content is whatever is the appropriate measure of content for each cloud service. For example, a unit of content for a music provider is either a song or an album. The unit of content for a movie provider is one film or video. In some embodiments, the unit of content may be a single viewing or accessing of a film, video, song, or album. In some embodiments, the unit of content is time limited access to a library of content. For example, a music provider may sell a month of access to a library of music for a flat fee. Other timeframes may be available as well, such as daily or weekly access to libraries of content. Other units of content are within the scope of the Controlled Environment Secure Media Streaming System 100 as well, as determined by the requirements and availability set by Cloud Service Providers 102.

Cloud Services 102 provide content to Integration Hub 104. The Integration Hub 104 interfaces with the various cloud services providers and prepares content for consumption by a resident of a secured facility. Integration Hub 104 utilizes Content Filter 120 to inspect content received from cloud service providers for suitability for use in a secured environment. Only permitted content is allowed to enter the Controlled Environment Secure Media Streaming System. Once content is retrieved, filtered, formatted, and packaged by Integration Hub 104, the content is stored in Data Warehouse 106. Data Warehouse 106 may be any type of data storage and retrieval system suitable to store and retrieve disparate types of data and content.

Distribution Hub 108 manages connections to a plurality of Secured Devices 110-116. Secured Devices request content from the Distribution Hub 108, the Distribution Hub 108 retrieves the content from the Data Warehouse 106, and then Distribution Hub 108 manages the transfer of content to the Secured Devices. In some embodiments, Distribution Hub 108 utilizes Content Filter 120 to determine whether or not a particular Secured Device can access particular content.

Distribution Hub 108 records content distribution and access by Secured Devices 110-116 and reports usage to the Reporting Services Module 118. Reporting Services Module 118, in turn, aggregates usage information and reports back to the respective Cloud Services 102.

Figure 1B:
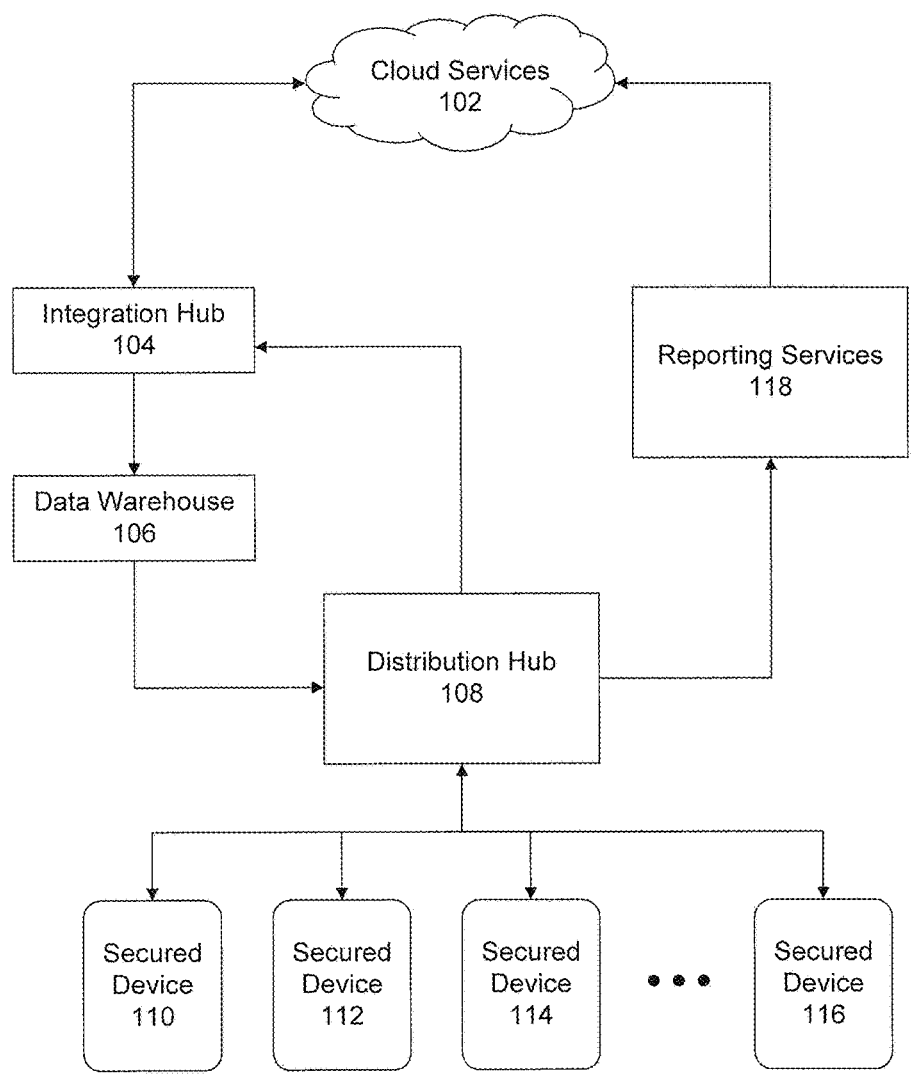

In an embodiment illustrated in FIG. 1B, the Content Filter 120 is integral to either the Integration Hub 104 or the Distribution Hub 108, or duplicated in both. In these embodiments, the Content Filter 120 is either shared between the Integration Hub 104 and the Distribution Hub 108 or both the Integration Hub 104 has a Content Filter and the Distribution Hub 108 has a second Content Filter.

Figure 1C:
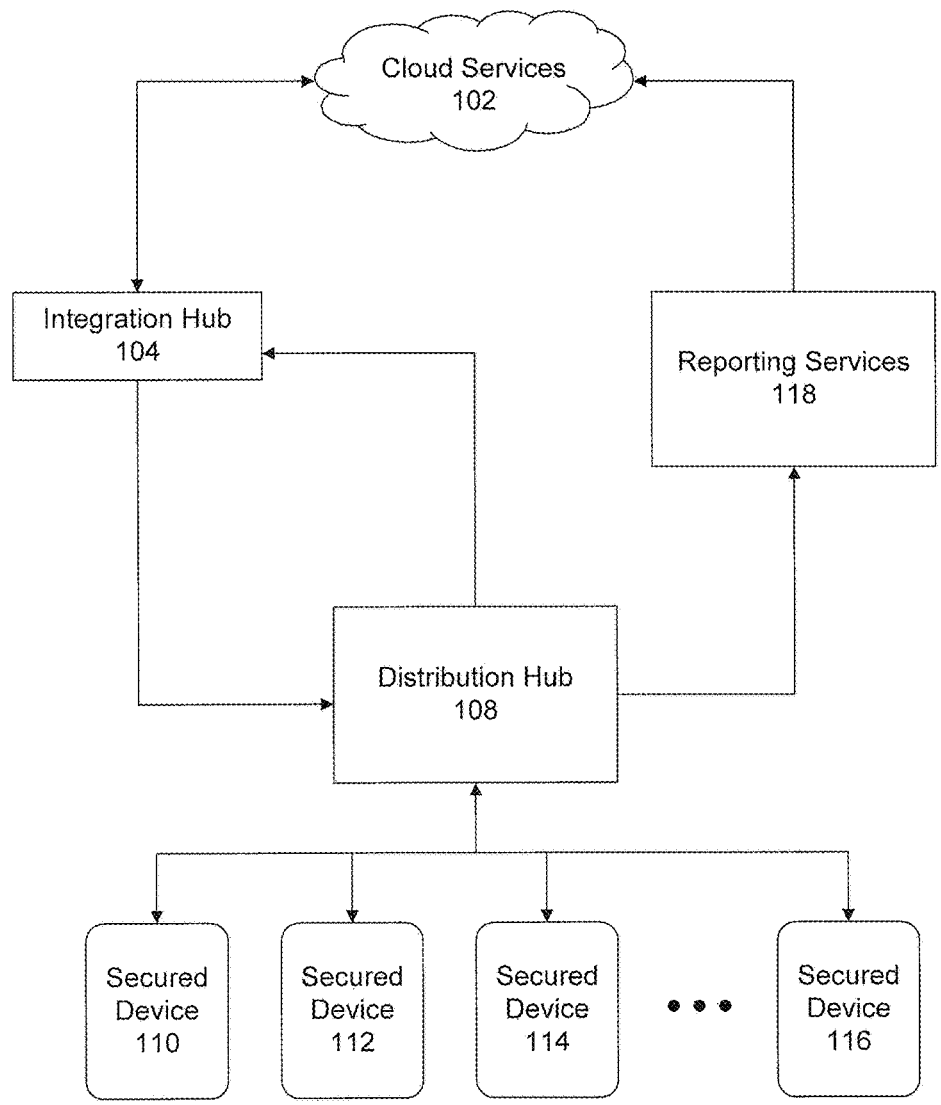

In an embodiment illustrated in FIG. 1C, the Data Warehouse 106 is omitted for streaming content. For example, there is no need to store data in the Data Warehouse 106 for content that is streamed in real-time from Cloud Services 102. In these embodiments, the content is still formatted, packaged, and processed by the Integration hub 104.

Integration Hub

Figure 2:
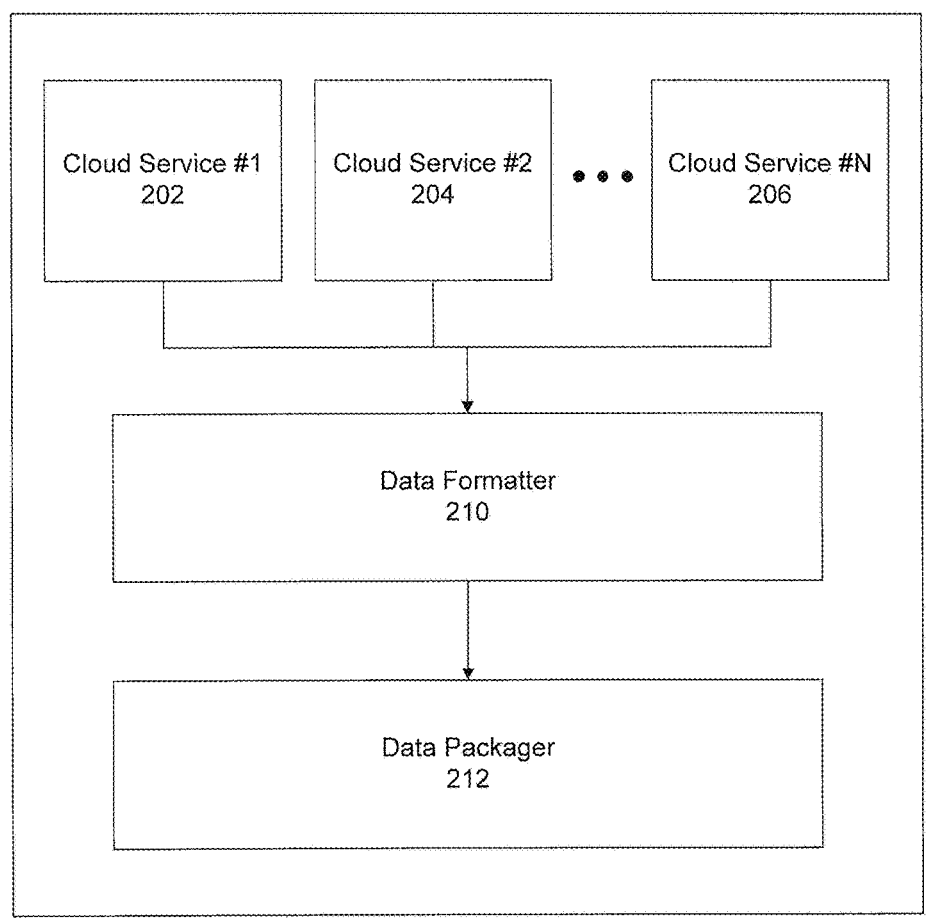
FIG. 2 illustrates a block diagram of an exemplary Integration Hub.

FIG. 2 illustrates an embodiment of Integration Hub 104. The Integration Hub 104 interfaces with various cloud services providers and prepares content for consumption by a resident of a secured facility. The Integration Hub 104 can interface with cloud services providers in a number of ways. Some cloud services provide an application programming interface (API) to interface with their service. In these cases the Integration Hub 104 utilizes the cloud provider's API to retrieve content from the cloud service provider. Some cloud services providers may not have an API but make available an endpoint through which clients can request content. For these types of cloud services the Integration Hub 104 provides for a connection to the data endpoint for content retrieval. The Integration Hub 104 is a modular design so that any number of Cloud Services 102 may be supported by the Integration Hub 104. Each Cloud Service provider has its own module 202-206 in the Integration Hub 104 to manage the connection to that Cloud Service provider. After retrieving content from cloud service providers, the Integration Hub 104 screens, formats, and packages the content for consumption.

Data Formatter 210 converts received content to formats compatible with Secured Devices 110-116. To this end, the Data Formatter 210 is configured with a plurality of conversion algorithms for converting certain incompatible formats to other compatible formats. The various conversion algorithms may be implemented in software and/or hardware. This allows the Controlled Environment Secure Media Streaming System 100 to be compatible with a wide range of content sources while at the same time not requiring each Secured Device 110-116 to be compatible with a large number of formats. For example, in an embodiment, Secured Device 110 is only capable of playing music encoded in the MP3 format and a certain cloud service provider only makes music available in the AAC format. In this example, the Data Formatter 210 re-encodes the AAC files from the cloud service provider into MP3 format files suitable for the Secured Device. The same type of transcoding is applicable to encoded content types such as video and audio. Other content types also have data formatting issues too. For example, electronic books are made available in various formats such as ePUB, Mobi, or PDF. Games and apps are also packaged in particular file format, for example the Android Application Package (APK) used by the Android™ operating system. The Data Formatter 210 is capable of converting or transcoding any necessary format, encoding, or file type as necessary to provide compatibility with a wide range of cloud service providers.

In some embodiments, cloud service providers require Digital Rights Management (DRM) of their content. DRM refers to various access control technologies that are used to restrict the usage of content. Controlled Environment Secure Media Streaming System 100 is compatible with a range of DRM systems that are well known to those of skill in the art. In these embodiments, the cloud service provider may either supply their own DRM scheme or require the Controlled Environment Secure Media Streaming System 100 to add its own DRM layer to content. In either case, the Data Packager 212 manages DRM for content to be delivered to Secured Devices 110-116. The Data Packager 212 ensures that any DRM that passes through the Integration Hub 104 is compatible with the Secured Devices 110-116.

Content Filter

Content Filter 120 inspects content data received from cloud service providers for suitability for use in a secured environment. In an embodiment, the Content Filter 120 analyzes a unit of content and returns a binary value indicating whether or not the unit of content should be filtered. In an embodiment, the Content Filter 120 scans incoming content and application data for viruses or malware. In an embodiment the Data Formatter 210 screens content for censorship. For example, content related to breaking out of prison would be inappropriate for a prisoner to receive. Similarly, the operating authority of any secured facility may enact certain content filters for suitability in their environment. In another example, a juvenile facility can block movies with an MPAA rating unsuitable for minor consumption. These are just some examples of the censorship the Content Filter 120 is capable of.

In an embodiment, Content Filter 120 operates on cloud provider supplied meta-data, such as industry standard ratings for music, movies, and games. Provider supplied meta-data would include industry standard ratings such as MPAA ratings. In other embodiments, Content Filter 120 analyses the content to filter out some content. For example, in an embodiment Content Filter 120 maintains a keyword block list that can operate on any kind of media. The keyword block list can contain words, phrases of multiple words, or portions of words. Content Filter 120 applies the keyword block list to text-based content by running a search for elements in the block list. For example, a book may be filtered based on censorship if it contains a word or phrase in the block list. Content not based on text data such as books can also be censored using the block list. Audio content is processed through a speaker independent voice recognition system to produce searchable text on which the block list can operate. Video content also containing audio can similarly be processed using speaker independent voice recognition to produce searchable text. Alternatively, some video content has close captioning content embedded in it that can be the basis for the block list text search. Likewise, video processing algorithms can be utilized for detecting video content that is unacceptable, such as scenes containing graphic violence or nudity, among other things.

Data Warehouse

After various data and content are retrieved, formatted, and packaged by the Integration Hub 104, the Cloud Services Delivery System stores data and content in a Data Warehouse 106. Data Warehouse 106 may be any type of data storage and retrieval system suitable to store and retrieve disparate types of data and content. In an embodiment, Data Warehouse 106 employs data de-duplication technologies to reduce the storage needs of large amounts of content. In an embodiment, Data Warehouse 106 is centralized and shared among many secured facilities. In another embodiment, Data Warehouse 106 is located on site at the secured facility and provides for local access to the content stored in the Data Warehouse 106. Data Warehouse 106 may also be implemented in a hybrid fashion, such that there is one centralized location storing all content, and various endpoint caches located at or near secured facilities with Cloud Services Delivery systems to offload some of the storage and retrieval requirements from the centralized Data Warehouse 106. In this way, Data Warehouse 106 acts as a content delivery network or CDN.

In an embodiment, Data Warehouse 106 is implemented on server and storage hardware, and in another embodiment, Data Warehouse 106 is implemented as a software layer on top of a third party data storage and retrieval system.

In an embodiment, Data Warehouse 106 is bypassed for streaming or on-demand content. Data Warehouse 106 can still provide CDN capabilities to on-demand or streaming content even if the content is not stored for long periods of time. In another embodiment, Data Warehouse 106 is bypassed entirely for streaming and other on-demand content such that content is delivered directly from the Integration Hub 104 to the Distribution Hub 108. In either embodiment, streaming content may be buffered at the Distribution Hub 108 or the Data Warehouse 106 as appropriate. For example, when a user operating a Secured Device pauses the playback of streaming or on-demand content the stream may be buffered at either location. In addition, streaming content may not be buffered at all and merely cease streaming while the content playback is paused.

Distribution Hub

Figure 3:
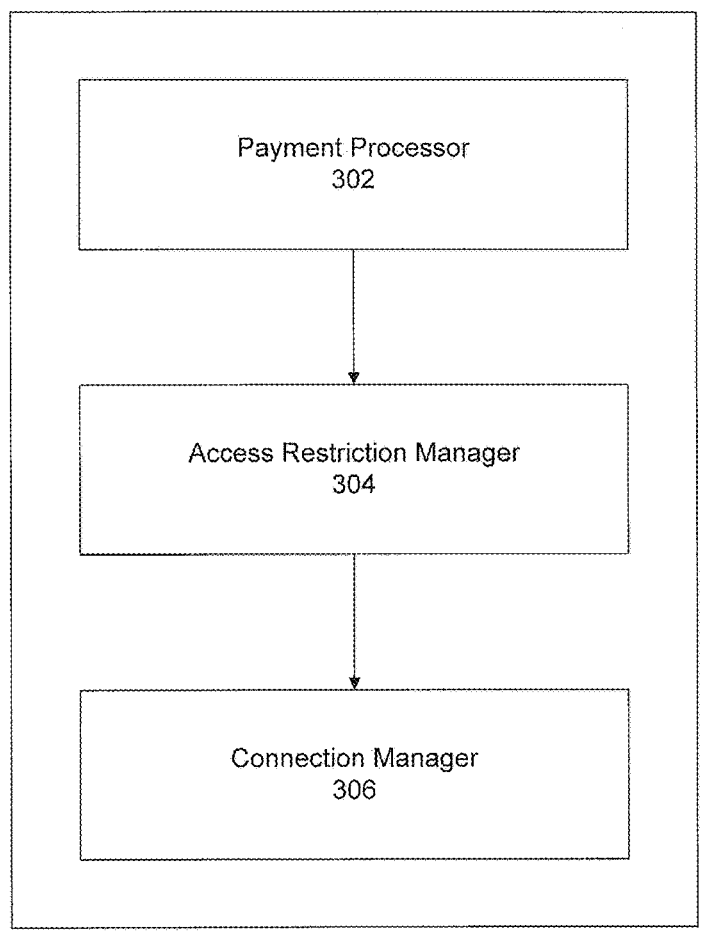
FIG. 3 illustrates a block diagram of exemplary Distribution Hub.

FIG. 3 illustrates one embodiment of the Distribution Hub 108. Distribution Hub 108 manages the distribution of content to Secured Devices 110-116. Distribution Hub 108 receives content requests from a Secured Device, retrieves the content from the Data Warehouse 106, and delivers it to the Secured Device. If the requested content is not available in the Data Warehouse 106, Distribution Hub 108 makes a request to the Integration hub 104 to retrieve the data from the appropriate Cloud Service 102.

Distribution Hub 108 employs access restrictions by Access Restriction Manager 304 on content to be delivered to Secured Devices. In an embodiment, Access Restriction Manager 304 includes all of the capabilities of Content Filter 120, but are applied on a per-resident basis rather than system-wide. For example, the Content Filter 120 may allow a particular music album to be added to the Data Warehouse 106 for a facility. However, restrictions from the Access Restriction Manager 304 can be enacted on a per-resident basis in the Distribution Hub 108 to prevent a particular resident to access that particular music album. In some embodiments, Access Restriction Manager 304 does not perform censorship and all censorship is performed by Content Filter 120. In some embodiments, Content Filter 120 is omitted and all censorship is performed by Access Restriction Manager 304. Other embodiments have censorship performed by both Content Filter 120 and Access Restriction Manager 304. The purpose of having two stages of censorship is to apply differing levels of censorship at the secured facility level and at the individual level. To provide an example, there may be certain types of content restricted from general distribution to any inmates, whereas each individual inmate may have personal restrictions that further specifically limit the types of content they are permitted to access.

In an embodiment, Content Filter 120 is directly used by Access Restriction Manager 304 to power the content filtering and censorship role of the Distribution Hub 108. In this embodiment the Access Restriction Manager 304 is essentially a gateway to the Content Filter 120 and the Access Restriction Manager 304 does not include censorship logic of its own. This reduces the complexity of the Distribution Hub 108. In an embodiment, the Content Filter 120 is external to Integration Hub 104. In other embodiments, the Content Filter 120 is integral to Integration Hub 104, but made available to the Distribution Hub 108. In another embodiment, Distribution Hub 108 contains its own content filtering and censorship engine separate from the Content Filter 120 of the Integration Hub 104.

In an embodiment, the Access Restriction Manager 304 of the Distribution Hub 108 screens for content censorship. For example, book content on breaking out of prison would be inappropriate for a prisoner to receive. Similarly, the operating authority of any secured facility may enact certain content filters for suitability in their environment. In another example, a juvenile facility can block movies with an MPAA rating unsuitable for minor consumption. These are just some examples of what kind of censorship the access restrictions of the Access Restriction Manager 304 is capable of. In some embodiments the access restrictions of the Access Restriction Manager 304 operates on cloud provider supplied meta-data, such as industry standard ratings for music, movies, and games. In some embodiments, the access restrictions of the Access Restriction Manager 304 analyses the content directly to filter out some content. For example, in an embodiment the access restrictions of the Access Restriction Manager 304 maintains a keyword block list that can operate on any kind of media. The keyword block list can contain words, phrases of multiple words, or portions of words. Access Restriction Manager 304 applies the keyword block list to text-based content by running a search for elements in the block list. For example, a book may be filtered based on censorship if it contains a word or phrase in the block list. Content not based on text data such as books can also be censored using the block list. Audio content is processed through a speaker independent voice recognition system to produce searchable text on which the block list can operate. Video content also containing audio can similarly be processed using speaker independent voice recognition to produce searchable text. Alternatively, some video content has close captioning content embedded in it that can be the basis for the block list text search.

In an embodiment, Access Restriction Manager 304 further enforces usage restrictions on Secured Devices 110-116. Usage restrictions operate in addition to content filtering or censorship. For example, the Access Restriction Manager 304 can restrict usage to a particular time of day, day of week, or location within the secured facility. In one embodiment this usage restriction only applies to acquisition of new content. For example, the Distribution Hub 108 may only allow new content to be transferred to the Secured Device during certain hours in the day. In this embodiment the Secured Device 110 can access content that is stored locally on the Secured Device 110 outside of these restricted times. In another embodiment, the Secured Device 110 requires authorization to access content stored on the Secured Device 110. This authorization comes from the Access Restriction Manager 304. In these embodiments, access to content can be restricted to certain hours of the day, or location. For example, in one embodiment the Access Restriction Manager 304 only allows access to content in a common area, and does not allow the Secured Device 110 to access content when the Secured Device 110 is in a prisoner's cell. In this way, access control to content, whether it is stored in the Data Warehouse 106 or on the Secured Device 110 is centrally controllable by the Distribution Hub 108 through the Access Restriction Manager 304.

The Distribution Hub 108 manages connections to Secured Devices 110-116 through the Connection Manager 306. In an embodiment, the Connection Manager 306 transfers content to Secured Devices 110-116 over a wireless network. Examples of wireless networks include Wi-Fi, cellular, Bluetooth, ZigBee, WiMAX, or other suitable wireless communications medium. In an embodiment, the Connection Manager 306 transfers content to Secured Devices 110-116 over a wired network. The wired network can either be always-connected or periodically connected. For example, in an embodiment the Distribution Hub 108 is integral to a stationary kiosk. The stationary kiosk has a data connection port compatible with a Secured Device. The data connection port may be, for example, an Ethernet port or a USB port. When a Secured Device is connected to the data connection port of the stationary kiosk, the Secured Device synchronizes with the Distribution Hub 108 to receive new content from Cloud Services 102. When the Secured Device is disconnected from the stationary kiosk, it can no longer receive content from the Distribution Hub 108. In other embodiments, the wired or wireless connection from the Distribution Hub 108 to the Secured Device is always on. In these embodiments the Secured Device can access content from Could Service 102 at any time.

Secured Device

Secured Devices 110-116 facilitate content consumption. In an embodiment, Secured Device 110 is a tablet computer. In another embodiment, Secured Device 110 is a stationary kiosk. In all embodiments, Secured Devices 110-116 comprise hardware and/or software that enable residents of secured facilities to consume or experience content from cloud service providers. For example, in an embodiment Secured Device 110 is a tablet computer that is capable of playing video and audio files from various Cloud Service Providers 102. Secured Device 110 includes a screen for consuming visual content and speakers or a headphone output for playing audio content. In some embodiments, Secured Device 110 does not have speakers but does have a headphone output.

In an embodiment, Secured Device 110 is a personal computing that is unique to a particular user. The personal computing device requires the user to authenticate prior to accessing Cloud Services 102. The Secured Device 110 is compatible with a range of authentication mechanisms, including passwords and biometrics. In an embodiment, the biometrics used include one or a combination of fingerprints, 3D images, 2D images, voiceprints, signatures, or the like. 3D and 2D images of facial features can be used in combination with facial recognition to authenticate users.

In an embodiment, Secured Device 110 is a kiosk comprising hardware and software to enable distribution of content to other content consumption devices. A user can bring a player device to the kiosk and transfer content from the kiosk to the player device. The user can then return to their living area to consume content acquired from the kiosk.

In some embodiments, Secured Device 110 also contains hardware and/or software to support other forms of communication. For example, in an embodiment, Secured Device 110 supports bi-directional voice and video calling. In an embodiment, Secured Device 110 also supports email and other text based communications such as SMS messaging. In this way, a single Secured Device 110 supports not only content consumption through the Controlled Environment Secure Media Streaming System 100 but also other forms of communication and entertainment.

Reporting Services

Many cloud service providers require reporting of usage information for purposes including but not limited to royalty payment calculation and license payment calculation. For example, if a cloud service provider provides music to the Controlled Environment Secure Media Streaming System 100 for playing in secured facilities, the Controlled Environment Secure Media Streaming System 100 needs to report back to the provider the number of times the music is played for the purposes of calculating the royalty rate that needs to be paid to the cloud service provider. Because the cloud service provider only sends a single copy of the music to the Controlled Environment Secure Media Streaming System 100, it does not have information on how many individual Secured Devices have received and/or played the music.

When the Distribution Hub 108 delivers a unit of content to a Secured Device, it sends a report to Reporting Services 118 indicating a delivery of the content. In some embodiments, content is licensed for unlimited plays once purchased. In these embodiments a single delivery report is generated the first time the content is delivered to a Secured Device. In some embodiments, content is licensed by consumption. For example, a movie may require a royalty payment for each time the movie is played. This is analogous to a movie rental. In these cases, the content is delivered by the Distribution Hub 108 to the Secured Device 110 with a Digital Rights Management (DRM) layer. Such DRM systems are well known to those skilled in the art. A unit of content with a DRM layer requires authorization for each time the content is accessed. In these embodiments, the Distribution Hub 108 sends a signal to Reporting Services 118 each time the DRM encapsulated content is accessed on the Secured Device 110.

Reporting Services 118 accumulates all of the content access information for each cloud service. Some access information relates to delivery of content, for example the download of a single song. Some access information related to the accessing of that content, for example each time the song is played on the Secured Device. The Reporting Services 118 aggregate both kinds of usage information as necessary for each Cloud Service 102.

In an embodiment, usage information is transmitted to the Cloud Service 102 as soon as it is received by the Reporting Services 118. In another embodiment, usage information is collected over a period of time and transmitted to the respective Cloud Service 102 once for a period of time. For example, some Cloud Services 102 may require monthly reporting of usage information.

In addition to the usage information, Reporting Services 118 can calculate the royalty payment to be paid to a particular Cloud Service 102. The Royalty can be based on content delivery or content access. Also, Reporting Services 118 can report information not related directly to a royalty, such as information useful for market research or demographic information.

Payment Options

Access to content from Cloud Services 102 can be paid for in a number of ways. In an embodiment, payment is processed by a Payment Processor 302 component of the Distribution Hub 108. In an embodiment, the Payment Processor 302 is separate from the Distribution Hub 108. In an embodiment, the Payment Processor 302 is a shared resource with other systems that also use the Payment Processor 302. For example, one other system that could use the Payment Processor 302 is an inbound and/or outbound voice and video communication system.

In an embodiment, residents of the secured facility set up a Debit Account to pay for access to content from Cloud Services 102. The Debit Account can be stored in one or more databases inside or out of the Controlled Environment Secure Media Streaming System 100. For example, the Debit Account can be stored and managed in Controlled Environment Secure Media Streaming System 100 within the system, or can located and accessed remotely, such as at a financial institution. The resident can load funds onto the Debit Account in person, for example at a commissary, by electronic means, or by telephone. Funds can be added to the Debit Account from cash, bank accounts, or credit card accounts. Optionally, non-residents of the secured facility can be allowed to add funds to the resident's Debit Account as well.

As another form of payment, an Advance Pay Account can also be associated with the resident. The Advance Pay Account can be funded by family and friends, and used for call fees associated with the resident. As with the Debit Account, the Controlled Environment Secure Media Streaming System 100 can access the Advance Pay Account to determine that there are sufficient funds, when content is purchased. In an embodiment, the Advance Pay Account is stored in one of the databases. In an embodiment, the Advance Pay Account can support any type of cloud service content.

In an embodiment, the Payment Processor does not immediately deduct funds from an account, but accumulates usage over a billing cycle and forwards a bill to the resident at the end of the billing cycle. Parameters such as the length of the billing cycle, the total amount allowed to be billed during one billing cycle, and the forms of payment that the bill can be paid in can be adjusted to suit the needs of a particular secured facility.

Operation

Figure 4:
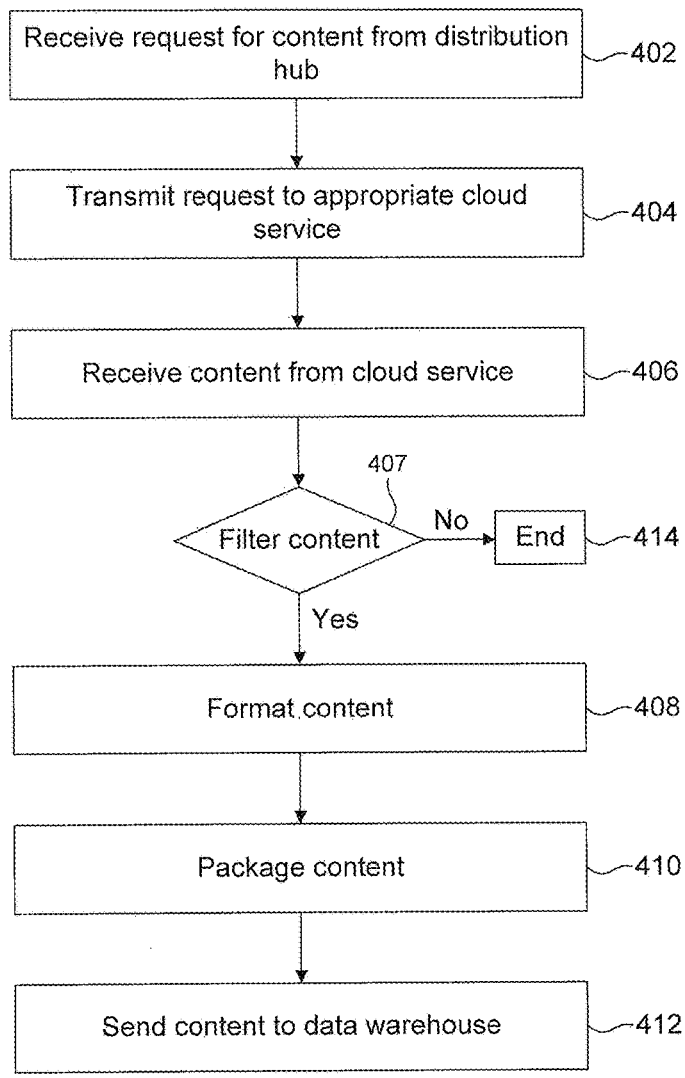
FIG. 4 illustrates the method of operation of an exemplary Integration Hub.

Operation of an exemplary Integration Hub 108 is illustrated in FIG. 4, which illustrates a method 400 for delivery of content from cloud service providers in secured facilities. At step 402, a request is received from the Distribution Hub 108 for a unit of content. The request is formatted and sent to the appropriate Cloud Service in step 404. In response, the Integration Hub 104 receives the requested content from the Cloud Service in step 406. At step 407 the Content Filter 120 is utilized to filter out content not suitable for the secured facility environment. If the unit of content is not suitable for the secured facility, the method ends at step 414. If the unit of content is suitable for consumption in the secured facility, the content is analyzed and transcoded in to an appropriate format by Data Formatter 210 in step 408 if necessary. The Integration Hub 104 maintains a list of acceptable formats supported by the Secured Devices. If the received content is not formatted in one of the appropriate formats, the content is transcoded into an appropriate format. If the content is received from the Cloud Service in an appropriate format that the Secured Devices can consume, no formatting or transcoding may be necessary.

At step 410 the content is packaged for consumption by Data Packager 212. In some embodiments, cloud service providers require Digital Rights Management (DRM) of their content. DRM refers to various access control technologies that are used to restrict the usage of content. Controlled Environment Secure Media Streaming System 100 is compatible with a range of DRM systems that are well known to those of skill in the art. In these embodiments, the cloud service provider may either supply their own DRM scheme or require the Controlled Environment Secure Media Streaming System 100 to add its own DRM layer to content. In either case, the Data Packager 212 manages adding DRM for content to be delivered to Secured Devices 110-116. The Data Packager 212 ensures that any DRM that passes through the Integration Hub 104 is compatible with the Secured Devices 110-116.

Finally, in step 412 the formatted and packaged content is delivered to the Data Warehouse 106 for storage. Once in the Data Warehouse 106, the Distribution Hub 108 is able to retrieve the content from the Data Warehouse and will not need to request the same content again from the Integration Hub 104. Data Warehouse 106 stores the formatted and packaged unit of content for a configurable length of time. Several algorithms may be used to determine when a particular unit of content is deleted from the Data Warehouse 106. In one embodiment, Data Warehouse 106 uses a least recently used algorithm to determine when to expunge content to make room for newly processed content. In another embodiment, Data Warehouse 106 uses analysis of frequency of use to determine which content to expunge. In any embodiment, the Data Warehouse 106 makes a best effort to maintain as much processed and packaged content as possible that is ready for instant delivery to consumers in order to avoid potential delays due to processing by the Integration Hub 104.

Figure 5:
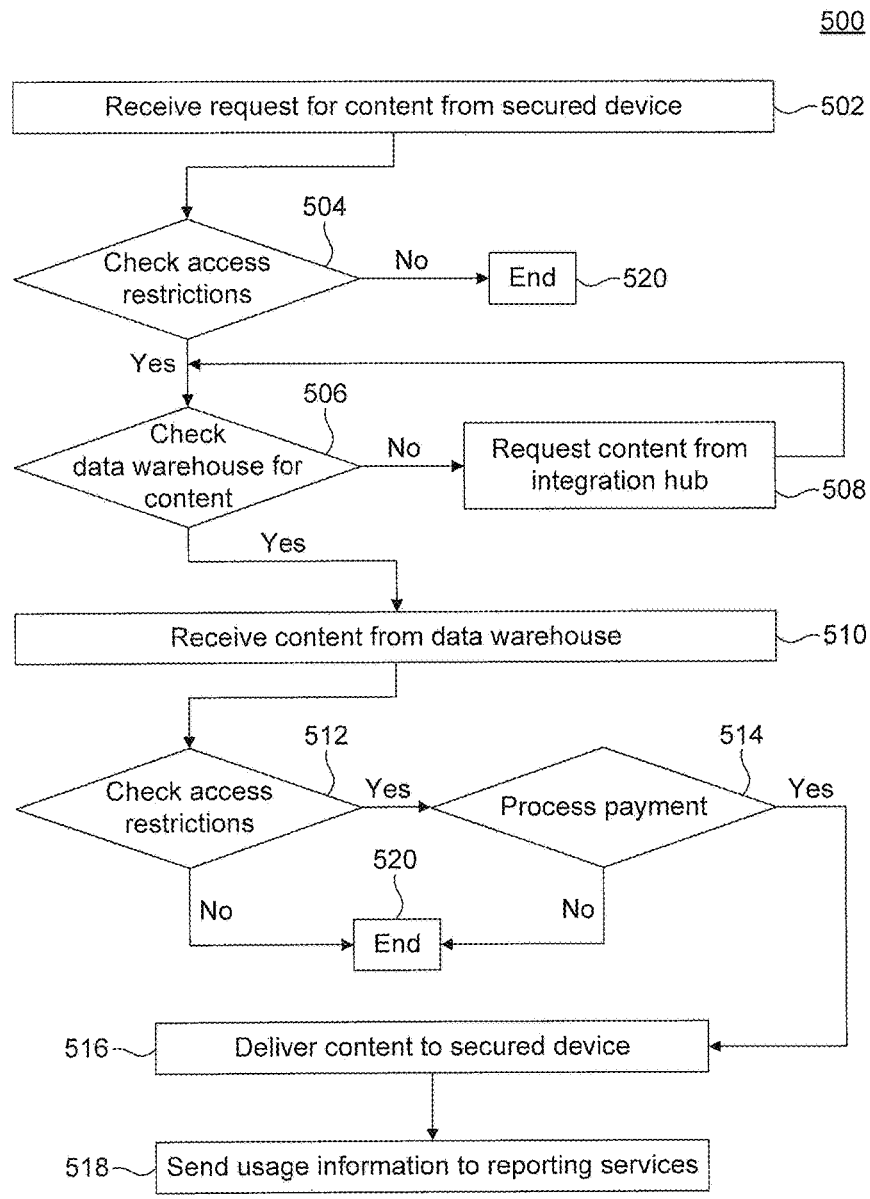
FIG. 5 illustrates the method of operation of an exemplary Distribution Hub.

Operation of an exemplary Distribution Hub 108 is illustrated in FIG. 5. First, in step 502, a request for a unit of content is received from a Secured Device. The request indicates the unit of content requested on the Secured Device, for example a particular song or movie. At step 504, the Distribution Hub 108 makes a preliminary check of access restrictions by using Access Restriction Manager 304. At this stage, Access Restriction Manager 304 can make an initial decision of whether the content requested is allowed to be delivered to the requestor based on available information. Information available at this step include identifying information about the content, including the content type, the title or other identifying name, the requesting device and user, and the time of request. The Access Restriction Manager 304 can filter out the content request without actually requesting the content, so that the Distribution Hub 108 does not need to request the content from the Integration Hub 104 if the content is not required to make the filtering decision. For example, if the requester does not have authorization to consume content at the time and place of requesting, then the Distribution Hub 108 can stop processing at this preliminary step. In another example, the unit of content may be blocked due to an inappropriate rating or subject matter for the entire secured facility. By making these determinations early in the process, the system can avoid unnecessary processing and network load.

At step 506 the Distribution Hub 108 requests the content from the Data Warehouse 106. If the Data Warehouse 106 does not have the requested content, at step 508 the Distribution Hub 108 makes a request to the Integration Hub 104 to acquire the content from an appropriate Cloud Service. The Distribution Hub 108 waits an amount of time, then checks the Data Warehouse 106 again to determine if the content has been added to the Data Warehouse 106. In an alternative embodiment, Distribution Hub 108 listens for a signal from the Data Warehouse 106 or the Integration Hub 104 that indicates the unit of content is ready for distribution. Once the content is present in the Data Warehouse 106, at step 510 the Distribution Hub 108 receives the content from the Data Warehouse 106.

At step 512, the Access Restriction Manager 304 determines whether the requested content can be provided to the requesting Secured Device and user. At this step, the Access Restriction Manager 304 has more information available with which to make a final determination. Specifically, the Access Restriction Manager 304 now has full access to the content and can make censorship decisions based on the entirety of the content. At this step the keyword filtering and meta-data based filtering can result in the content access being denied even though the content passed the initial filtering step at step 504. In an embodiment, Access Restriction Manager 304 caches censorship decisions so that the content does not need to be re-analyzed for every access restriction determination. Access Restriction Manager 304 also re-analyses time-based restrictions at step 512 as significant time may have elapsed in the acquisition process between step 504 and step 512. These time based restrictions include any time-of-day or day-of-week restrictions placed on an inmate, groups of inmates, or facility-wide. Access Restriction Manager 304 also re-analyses other access restrictions previously checked at step 504 to detect if any restrictions have changed in the time between step 504 and step 512. Such restrictions include disciplinary and other controls configurable by the authority operating the secured facility. In addition to censorship restrictions, Restriction Manager 304 also analyzes content consumption restrictions at this step. For example, a unit of content may have restrictions on the number of plays or otherwise be time or access limited based on content consumption rights for that unit of content. If the Access Restriction Manager 304 authorizes the content to be delivered to the Secured Device at step 512, payment for the content is processed at step 514 by Payment Processor 302. Payment Processor 302 charges, for example, a Debit Account or an Advance Pay Account or periodically bills users for their use and access to content. If payment cannot be processed at step 514, the method ends. If payment is successfully processed, the method continues.

Next, the Connection Manager 306 delivers the content to the requesting Secured Device at step 516. As described above, the Connection Manager 306 may use any combination of permanent or transient wired or wireless connections to manage the delivery of content to a Secured Device. Finally, at step 518 the Distribution Hub 108 sends usage information to Reporting Services 118. The usage information includes at least information to identify the unit of content and the user who requested the unit of content. Other usage information can be sent to the Reporting Services 118 at this time as well according to the needs of any particular Cloud Service provider.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A secure media streaming system for a controlled environment including a plurality of secured facilities, the plurality of secured facilities including a plurality of secured devices, the secure media streaming system comprising:
    a hardware based integration hub configured to:
        receive a unit of content from a service provider,
        analyze the unit of content for a first type of content that is not suitable for use in a secured facility from among the plurality of secured facilities, the first type of content being associated with a first content access restriction for restricting access of the secured facility to the first type of content,
        censor the first type of content from the unit of content in accordance with the first content access restriction to provide a censored unit of content when the first content access restriction indicates the first type of content is to be censored from the unit of content, and
        convert the censored unit of content from a first format incompatible with a secured device within the secured facility from among the plurality of secured devices to a second format compatible with the secured device in accordance with a conversion algorithm from among a plurality of conversion algorithms to provide a facility-level-censored unit of content; and
    a hardware based distribution hub configured to:
        receive a request to access the unit of content from the secured device,
        analyze the facility-level-censored unit of content for a second type of content that is not suitable to be accessed by the secured device, the second type of content being associated with a second content access restriction for restricting access of the secured device to the second type of content,
        censor the second type of content that is not suitable to be accessed by the secured device from the facility-level-censored unit of content in accordance with the second content access restriction to provide a device-level-censored unit of content, and
        deliver the device-level-censored unit of content to the secured device.

2. The secure media streaming system of claim 1, wherein the hardware based integration hub comprises:
 a content filter configured to:
  analyze the unit of content for the first type of content in accordance with the first content access restriction, and
  return a binary value indicating whether the first type of content should be censored from the unit of content; and
 a data formatter configured to censor the first type of content from the unit of content when the binary value indicates the first type of content should be censored from the unit of content.

3. The secure media streaming system of claim 2, wherein the data formatter is further configured to convert the censored unit of content from the first format incompatible with the secured device to the second format compatible with the secured device in accordance with the conversion algorithm.

4. The secure media streaming system of claim 1, wherein the hardware based distribution hub comprises:
 an access restriction manager configured to analyze the facility-level-censored unit of content for a keyword from among a keyword block list that is associated with the second type of content.

5. The secure media streaming system of claim 4, wherein the access restriction manager is further configured to restrict usage of the device-level-censored unit of content to a time of day, a day of week, or a location within the secured facility in accordance with a usage restriction.

6. The secure media streaming system of claim 1, wherein the hardware based distribution hub is further configured to:
 determine a royalty payment associated with the unit of content to be paid to the service provider to access the unit of content, and
 deduct the royalty payment from a monetary account associated with a user of the secured device.

7. The secure media streaming system of claim 1, wherein the unit of content comprises:
 music, a video, a television show, a movie, a digital book, a digital magazine, a game, or a software application.

8. A method for operating a secure media streaming system for a controlled environment including a plurality of secured facilities, the plurality of secured facilities including a plurality of secured devices, the method comprising:
 receiving a request to access a unit of content from a secured device from among the plurality of secured devices, the secured device being located within a secured facility from among the plurality of secured facilities;
 receiving the unit of content from a service provider;
 analyzing the unit of content for a first type of content that is not suitable for use in the secured facility, the first type of content being associated with a first content access restriction for restricting access of the secured facility to the first type of content;
 censoring the first type of content from the unit of content in accordance with the first content access restriction to provide a censored unit of content when the first content access restriction indicates the first type of content is to be censored from the unit of content;
 converting the censored unit of content from a first format incompatible with the secured device to a second format compatible with the secured device in accordance with a conversion algorithm from among a plurality of conversion algorithms to provide a facility-level-censored unit of content;
 analyzing the facility-level-censored unit of content for a second type of content that is not suitable to be accessed by the secured device, the second type of content being associated with a second content access restriction for restricting access of the secured device to the second type of content;
 censoring the second type of content that is not suitable to be accessed by the secured device from the facility-level-censored unit of content in accordance with the second content access restriction to provide a device-level-censored unit of content; and
 delivering the device-level-censored unit of content to the secured device.

9. The method of claim 8, wherein the analyzing the unit of content for the first type of content comprises:
 analyzing the unit of content for the first type of content in accordance with the first content access restriction; and
 returning a binary value indicating whether the first type of content should be censored from the unit of content; and
 wherein the censoring the first type of content comprises:
  censoring the first type of content from the unit of content when the binary value indicates the first type of content should be censored from the unit of content.

10. The method of claim 8, wherein the analyzing the facility-level-censored unit of content for the second type of content comprises:
 analyzing the facility-level-censored unit of content for a keyword from among a keyword block list that is associated with the second type of content.

11. The method of claim 10, wherein the analyzing the facility-level-censored unit of content for the second type of content further comprises:
 restricting usage of the device-level-censored unit of content to a time of day, a day of week, or a location within the secured facility in accordance with a usage restriction.

12. The method of claim 8, further comprising:
 determining a royalty payment associated with the unit of content to be paid to the service provider to access the unit of content, and
 deducting the royalty payment from a monetary account associated with a user of the secured device.

13. The method of claim 8, wherein the unit of content comprises:
 music, a video, a television show, a movie, a digital book, a digital magazine, a game, or a software application.

14. A secure media streaming system for a controlled environment, the secure media streaming system comprising:
 a hardware based integration hub configured to:
  analyze a unit of content for a first type of content that is not suitable for use in a secured facility from among a plurality of secured facilities within the controlled environment in accordance with a first content access restriction to restrict access of the secured facility to the first type of content,
  censor the first type of content from the unit of content in accordance with the first content access restriction to provide a censored unit of content when the first content access restriction indicates the first type of content is to be censored from the unit of content, and
  convert the censored unit of content from a first format incompatible with the secured device to a second format compatible with the secured device in accordance with a conversion algorithm from among a plurality of conversion algorithms to provide a facility-level-censored unit of content; and a hardware based distribution hub configured to:
analyze the facility-level-censored unit of content for a second type of content that is not suitable to be accessed by a secured device within the secured facility in accordance with a second content access restriction for restricting access of the secured device to the second type of content,
censor the second type of content that is not suitable to be accessed by the secured device from the facility-level-censored unit of content in accordance with the second content access restriction to provide a device-level-censored unit of content, and
deliver the device-level-censored unit of content to the secured device.

15. The secure media streaming system of claim 14, wherein the hardware based integration hub comprises:
a content filter configured to:
analyze the unit of content for the first type of content in accordance with the first content access restriction, and
return a binary value indicating whether the first type of content should be censored from the unit of content; and
a data formatter configured to censor the first type of content from the unit of content when the binary value indicates the first type of content should be censored from the unit of content.

16. The secure media streaming system of claim 15, wherein the data formatter is further configured to convert the censored unit of content from the first format incompatible with the secured device to the second format compatible with the secured device in accordance with the conversion algorithm.

17. The secure media streaming system of claim 14, wherein the hardware based distribution hub comprises:
an access restriction manager configured to analyze the facility-level-censored unit of content for a keyword from among a keyword block list that is associated with the second type of content.

18. The secure media streaming system of claim 17, wherein the access restriction manager is further configured to restrict usage of the device-level-censored unit of content to a time of day, a day of week, or a location within the secured facility in accordance with a usage restriction.

19. The secure media streaming system of claim 14, wherein the hardware based distribution hub is further configured to:
determine a royalty payment associated with the unit of content to be paid to a service provider to access the unit of content, and
deduct the royalty payment from a monetary account associated with a user of the secured device.

20. The secure media streaming system of claim 14, wherein the unit of content comprises:
music, a video, a television show, a movie, a digital book, a digital magazine, a game, or a software application.

21. A method for operating a secure media streaming system for a controlled environment, the method comprising:
analyzing a unit of content for a first type of content that is not suitable for use in a secured facility from among a plurality of secured facilities within the controlled environment in accordance with a first content access restriction to restrict access of the secured facility to the first type of content;
censoring the first type of content from the unit of content in accordance with the first content access restriction to provide a censored unit of content when the first content access restriction indicates the first type of content is to be censored from the unit of content;
converting the censored unit of content from a first format incompatible with the secured device to a second format compatible with the secured device in accordance with a conversion algorithm from among a plurality of conversion algorithms to provide a facility-level-censored unit of content;
analyzing the facility-level-censored unit of content for a second type of content that is not suitable to be accessed by a secured device within the secured facility in accordance with a second content access restriction for restricting access of the secured device to the second type of content;
censoring the second type of content that is not suitable to be accessed by the secured device from the facility-level-censored unit of content in accordance with the second content access restriction to provide a device-level-censored unit of content; and
delivering the device-level-censored unit of content to the secured device.

22. The method of claim 21, wherein the analyzing the unit of content for the first type of content comprises:
analyzing the unit of content for the first type of content; and
returning a binary value indicating whether the first type of content should be censored from the unit of content; and
wherein the censoring the first type of content comprises:
censoring the first type of content from the unit of content when the binary value indicates the first type of content should be censored from the unit of content.

23. The method of claim 21, wherein the analyzing the facility-level-censored unit of content for the second type of content comprises:
analyzing the facility-level-censored unit of content for a keyword from among a keyword block list that is associated with the second type of content.

24. The method of claim 23, wherein the analyzing the facility-level-censored unit of content for the second type of content further comprises:
restricting usage of the device-level-censored unit of content to a time of day, a day of week, or a location within the secured facility in accordance with a usage restriction.

25. The method of claim 21, further comprising:
determining a royalty payment associated with the unit of content to be paid to a service provider to access the unit of content, and
deducting the royalty payment from a monetary account associated with a user of the secured device.

26. The method of claim 21, wherein the unit of content comprises:
music, a video, a television show, a movie, a digital book, a digital magazine, a game, or a software application.

* * * * *